United States Patent [19]

Frieder, Jr. et al.

[11] 4,023,209
[45] May 17, 1977

[54] PROTECTIVE HELMET ASSEMBLY WITH SEGMENTAL OUTER SHELL

[75] Inventors: Leonard P. Frieder, Jr., Dalton; Jackson A. Aileo, Carbondale, both of Pa.

[73] Assignee: Gentex Corporation, Carbondale, Pa.

[22] Filed: Dec. 17, 1975

[21] Appl. No.: 641,450

[52] U.S. Cl. .................................................. 2/6
[51] Int. Cl.² .......................................... A42B 3/00
[58] Field of Search .................... 2/6, 423, 410, 41

[56] References Cited
UNITED STATES PATENTS

| 3,087,028 | 4/1963 | Bonnin | 179/156 R |
|---|---|---|---|
| 3,239,842 | 3/1966 | Marchello | 2/423 X |
| 3,470,564 | 10/1969 | Aileo | 2/423 |
| 3,665,514 | 5/1972 | Durand | 2/6 X |
| 3,784,984 | 1/1974 | Aileo | 2/423 |
| 3,786,519 | 1/1974 | Aileo | 2/6 |
| 3,789,427 | 2/1974 | Aileo | 2/423 |
| 3,833,935 | 9/1974 | Ansite et al. | 2/6 |
| 3,906,547 | 9/1975 | Aileo | 2/6 |

FOREIGN PATENTS OR APPLICATIONS

120,607    11/1918    United Kingdom ............ 2/6

Primary Examiner—Alfred R. Guest
Attorney, Agent, or Firm—Shenier & O'Connor

[57] ABSTRACT

A protective helmet assembly includes a flexible inner helmet designed to fit relatively closely over a wearer's head and fitted with one or more impact-absorbing pads, and a hard rigid ballistic outer shell comprising a frontal portion releasably secured over the forehead area of the inner helmet and a rear portion releasably secured over the crown-to-nape area of the inner helmet, and in which assembly the inner helmet is provided with a pad of relatively flexible ballistic material in the forehead region thereof below the frontal portion of the outer shell.

13 Claims, 19 Drawing Figures

PROTECTIVE HELMET ASSEMBLY WITH SEGMENTAL OUTER SHELL

BACKGROUND OF THE INVENTION

This invention relates to a protective helmet assembly for use in military and other applications requiring protection of the head against ballistic impacts.

There has previously been disclosed in U.S. Pat. Nos. 3,784,984 and 3,789,427, both issued to Jackson A. Aileo, a protective helmet assembly having a flexible inner helmet and a rigid outer assembly. The flexible inner assembly comprises a fabric envelope designed to fit over a wearer's head and having a plurality of pockets for receiving pads of bump resistant impact-absorbing material. The fabric envelope is also fitted with at least one rigid earcup, used either for sound attenuation or for communications or both. An outer hard and rigid ballistic shell is provided for use over the inner helmet assembly where ballistic protection is required. The provision of the fabric envelope with pad receiving pockets permits the construction of a helmet assembly which, while flexible and adjustable to the head of the individual wearer, affords impact protection against bumps even without the use of a ballistic shell.

While this arrangement has proved to be advantageous, it has not completely solved the problems inherent in the prior art. In part, these problems arise from the design of the outer ballistic shell, the use of which is still necessary in certain applications. Since the flexible inner helmet assembly accommodates a range of head sizes, the outer assembly is necessarily made somewhat large to accommodate the largest head sizes, adding to its bulk and weight. It has also been found that the outer ballistic shell interferes in certain applications requiring close proximity between the wearer's face and the equipment he is working with, such as a gunsight. In order to use such equipment, the operator must remove the outer shell, increasing his risk of injury from missiles and the like.

Another problem inherent in the prior art involves the design of an unobtrusive, yet effective microphone for two-way voice communication. Prior art arrangements using a boom or similar assembly to place the microphone in front of the mouth lead to the problems referred to earlier when the wearer is working in close facial proximity to equipment. Previous attempts to place the microphone within the earcup have resulted in feedback between the microphone and the adjacent earphone.

SUMMARY OF THE INVENTION

One object of the present invention is to provide a protective helmet assembly having a hard outer ballistic shell which more readily accommodates a wide range of head sizes.

Another object of the present invention is to provide a protective helmet assembly which permits the wearer to work with his head and eyes in relatively close proximity to instruments without exposing him to excessive damage from ballistic missiles.

A further object of the present invention is to provide a protective helmet assembly having a microphone permitting adequate access to the face of the wearer while being free from objectionable acoustic feedback.

Other and further objects will be apparent from the following description.

In general, our invention contemplates a helmet having a flexible inner helmet and a hard outer shell formed in two pieces. The first piece of the outer shell is formed from a ballistic material and extends from the crown approximately back to the nape of the neck, while the second piece is preferably formed from a thinner, nonballistic material and extends across the forehead to cover the frontal area. The flexible inner assembly is fitted with a pad of relatively flexible ballistic material over the frontal area beneath the nonballistic outer frontal piece. If desired, the flexible ballistic pad may be received in a pocket formed in the frontal portion of the inner helmet, the rear portion of the inner helmet having a plurality of pockets for receiving pads of impact-absorbing material in the manner described earlier.

The above-described arrangement permits the construction of a protective helmet assembly having all of the advantages described earlier, yet providing virtually complete ballistic protection. Even when the frontal portion of the outer shell is removed, the forehead area of the wearer remains protected by the ballistic pad provided in the frontal portion of the inner helmet.

Another aspect of our invention contemplates a contact microphone placed within the acoustic seal of one of the earcups housing the earphones. The contact microphone is urged against the temple area of the wearer, preferably, by a spring or other resilient means housed in a shock-mounted receptacle and means are provided for disabling the earphone in the earcup housing the microphone whenever the microphone is activated. This arrangement is highly effective in shielding the contact microphone from surrounding noise and in making the microphone physically unobtrusive. At the same time, since the adjacent earphone is disabled whenever the microphone is actuated, there is no problem of underdesirable acoustic feedback.

BRIEF DESCRIPTION OF THE DRAWINGS

In the drawings, which are incorporated into the instant specification and are to be read in conjunction therewith, and in which like reference numerals are used to indicate like parts.

DETAILED DESCRIPTION OF THE INVENTION

Referring to FIGS. 1 to 13, our protective helmet assembly, indicated generally by the reference numeral 20, includes an inner helmet indicated generally by the reference character 22 having a pair of outer center panels 24 and 26, a pair of outer side panels 28 and 30, and a pair of lune-shaped segments 32 and 34 located between the middle portions of the outer center panels 24 and 26 and the middle portions of the adjacent outer side panels 28 and 30, respectively. Each of the panels 24, 26, 28, and 30, and segments 32 and 34 is preferably made from a flexible, relatively yieldable netting such as nylon mesh to aid in ventilating the head of the wearer.

Figure 1:
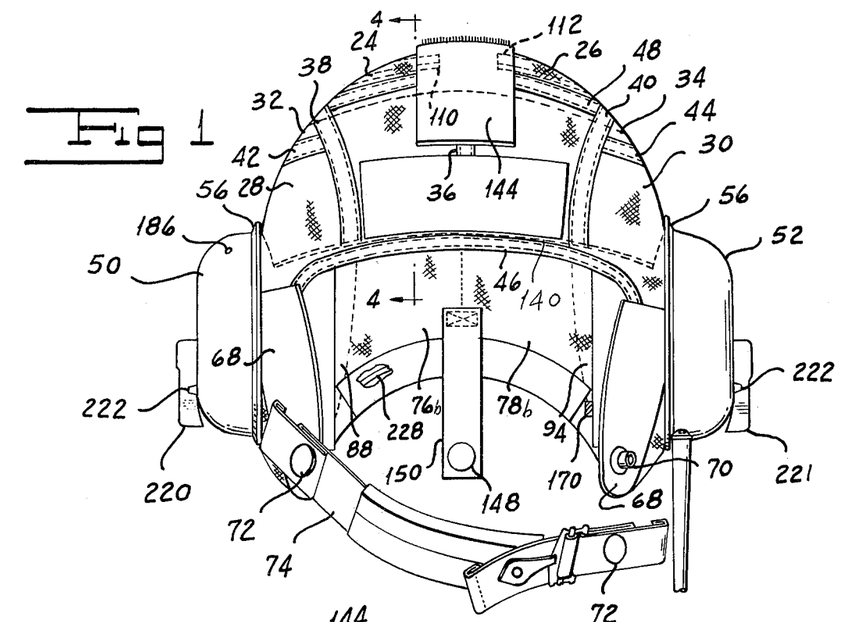
FIG. 1 is a front elevation of the inner helmet of our protective helmet assembly.
Figure 2:
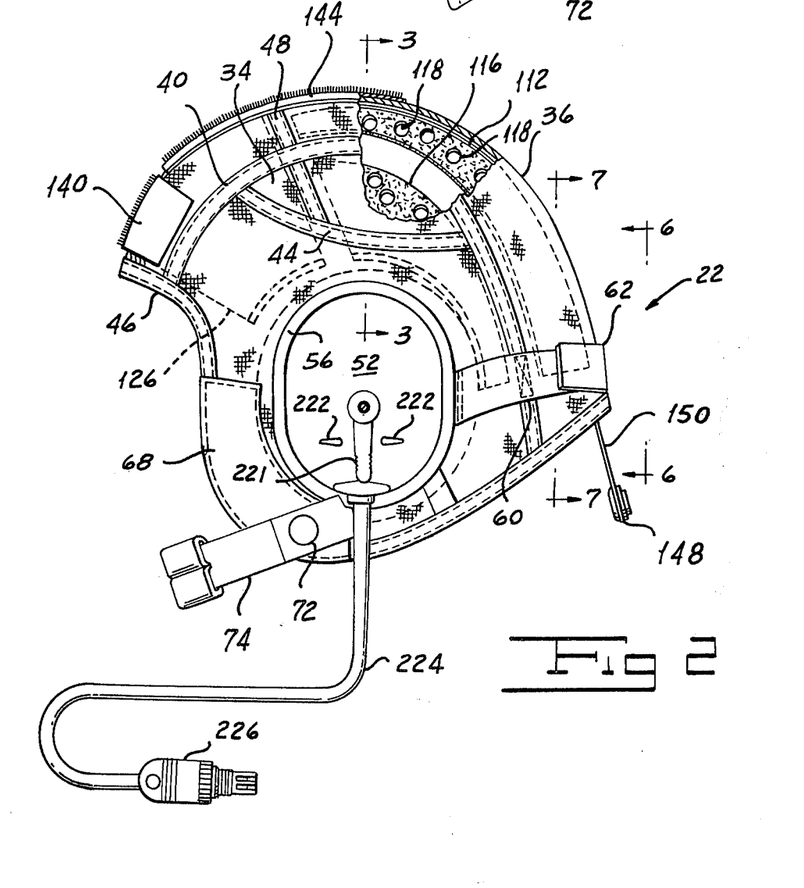
FIG. 2 is a side elevation of the helmet shown in FIG. 1 with parts broken away.
Figure 3:
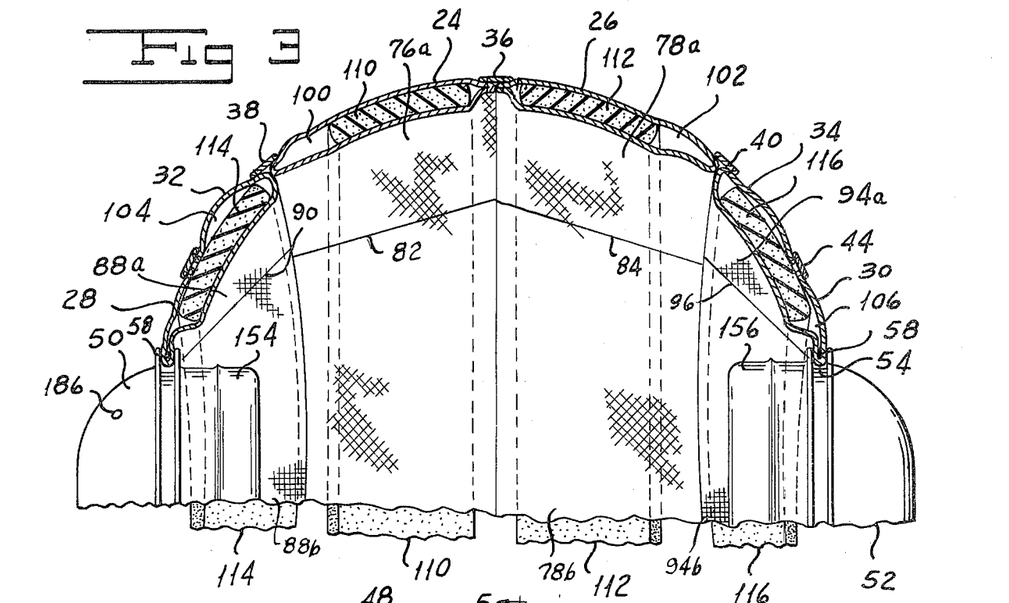
FIG. 3 is an enlarged fragmentary section of the inner helmet of our protective helmet assembly, taken along the line 3—3 of FIG. 2.
Figure 4:
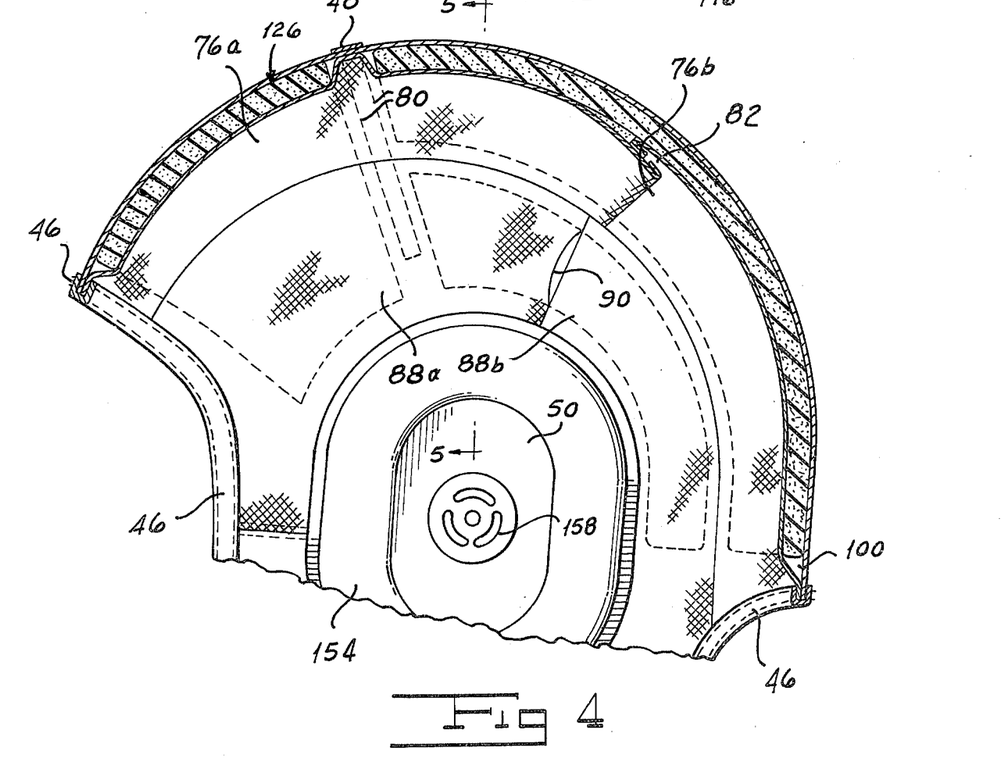
FIG. 4 is a fragmentary section of the inner helmet of our protective helmet assembly, taken along the line 4—4 of FIG. 1 and drawn on an enlarged scale.
Figure 5:
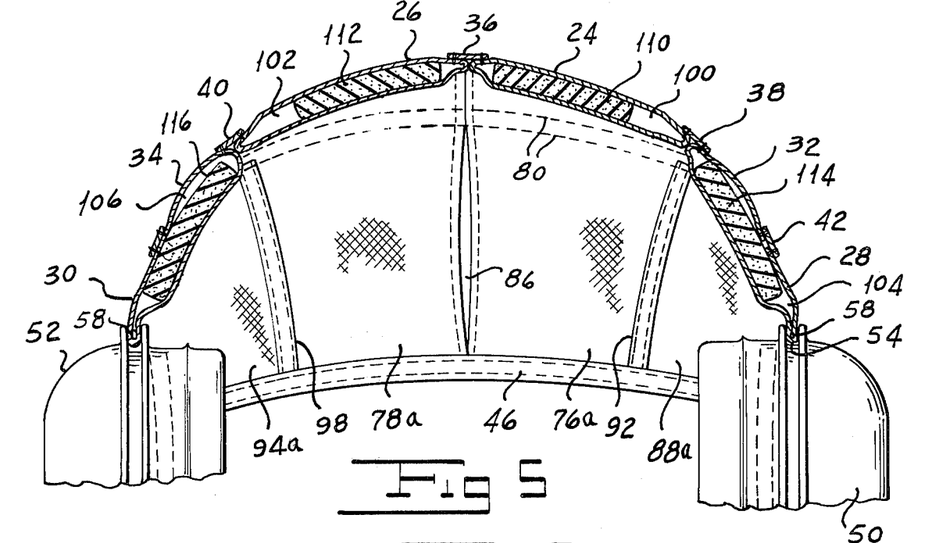
FIG. 5 is a fragmentary section of the inner helmet of our protective helmet assembly, taken along the line 5—5 of FIG. 4.
Figure 6:
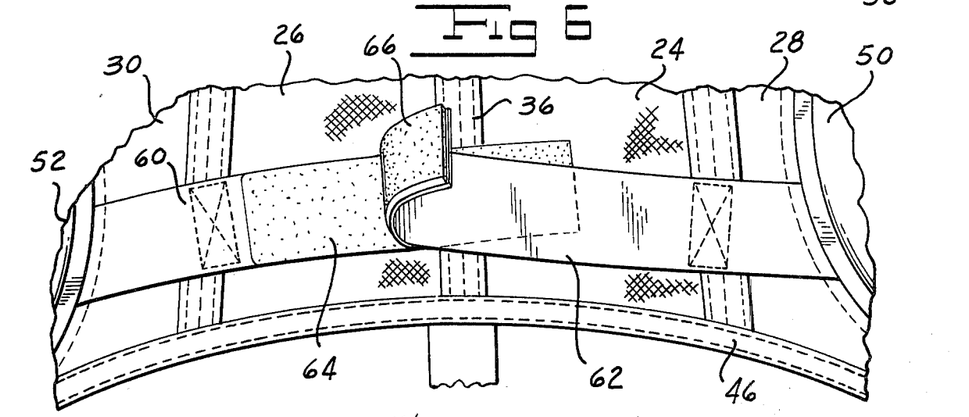
FIG. 6 is a fragmentary rear elevation of the inner helmet of our improved ballistic helmet assembly, taken along the line 6—6 of FIG. 2 and drawn on an enlarged scale.

Outer center panels 24 and 26 are adjacent to one another and extend longitudinally from the forward edge to the rear edge of the helmet 22, each panel lying on one side of the centerline. Panels 24 and 26 are joined by a longitudinal tape 36 of inelastic woven fabric which extends along the centerline and is stitched to the respective panels. We connect the center panels 24 and 26 to the respective adjacent side panels 28 and 30 and segments 32 and 34 by a pair of inelastic woven tapes 38 and 40, which are stitched to the respective panels and segments. Similarly, stitched tapes 40 and 42 connect the lunar segments 32 and 34 respectively to the outer side panels 28 and 30. A binding tape 46 is stitched along the lower edges of center panels 24 and 30 and side panels 28 and 30. A tape 48 is stitched laterally across center panels 24 and 26 and segments 32 and 34 for a purpose to be described. Tape 48 is located such that it intersects the center tape 36 approximately four inches behind the front edge of the helmet 22.

A pair of inner central panels 76 and 78 disposed respectively below the outer center panels 24 and 26 are generally coextensive therewith. We stitch or otherwise secure the front and rear edges of panel 76 to the peripheral tape 46, the underlying transverse portion to tape 48 (through stitchings 80), and the portions of the side edges of the panel 76 extending rearwardly from tape 48 to tapes 36 and 38, respectively. A transverse slit 82 located to the rear of tape 48 divides the panel 76 into front and rear parts 76a and 76b and provides access to the space between panels 24 and 76 to the rear of tape 48 for a purpose to be described.

In a similar manner, we secure the front and rear edges of panel 78 to the peripheral tape 46, the underlying transverse portion to the tape 48 (through stitchings 80), and the portions of the side edges of panel 78 extending rearwardly from tape 48 to tapes 36 and 40. A transverse slit or opening 84 at a location to the rear of the tape 48 divides panel 78 into front and rear parts 78a and 78b to provide access to the space between panels 26 and 78 for a reason to be described. The portions of the center side edges of panels 76 and 78 extending forwardly of tape 48 are left free to provide access to the space between the portions of panels 24 and 26 and 76 and 78 forwardly of tape 48.

An inner side panel 88 extending along the undersides of outer side panel 28 and outer lunar segment 32 is secured to tape 46 along its lower edge, to tape 38 along its upper edge, and to tape 48 across a portion of its width. A laterally extending slit 90 located to the rear of center of panel 88 divides it into a front piece 88a and a rear piece 88b. Panel 88 is joined to panel 76 along that portion of their common boundary forward of the lateral tape 48 by a tape 92 stitched to both panels along their underside. An inner side panel 94 underlying outer side panel 30 and outer lunar segment 34 is secured to tape 46 along its lower edge, to tape 40 along its upper edge and to tape 48 across a portion of its width. The panel 94 is divided towards its rear end into a fore piece 94a and a rear piece 94b to form a slit 96 at their junction. Panel 94 is jointed to panel 78 along that portion of their common boundary forward of the lateral tape 48 by a tape 98 stitched to both panels along their underside.

Preferably, the nettings of the central panels 24 and 26 are bias cut such that their threads are parallel at their common boundary near the crown area of the helmet assembly 22 and intersect at an acute angle which increases in either longitudinal direction away from the crown. Similarly, the nettings of the lunar segments 32 and 34 are preferably bias cut such that their threads are parallel to those of the adjacent central panel 24 or 26, respectively, near the crown area and intersect an acute angle which increases in either longitudinal direction away from the crown. When cut in such a fashion, the nettings, and hence the inner helmet assembly 22, are easily conformable to the shape of the individual wearer's head.

Preferably, for ease of fitting, the inner panels 76, 78, 88, and 94 are bias cut such that their threads are parallel along the central portion of the common boundary of any two panels and intersect at acute angles which increase in either directions away from the central portion.

The inner helmet 22 is provided with a pair of right and left earcups 50 and 52, which are received in openings 54 in right side inner and outer panels 28 and 88 and left side inner and outer panels 30 and 94, respectively. Each of the earcups 50 and 52 is provided with a pair of retaining flanges 56 for receiving the edge of the side panel opening 54. Preferably, we provide a loop of wire or braided textile 58 around each opening 58 within the fabric to retain the earcup in place.

We secure one end of each of a pair of nape straps 60 and 62, respectively, to the outer side panels 28 and 30. The other ends of the straps carry complementary strips 64 and 66 of hook-and-loop type material for readily releasable interconnection. Suitable such strips are sold under the trademark "Velcro", owned by the American Velcro Company. Straps 60 and 62 facilitate adjustment of helmet size at the nape of the wearer's neck.

Each of the outer side panels 28 and 30 is equipped along its lower frontal portion with a segment 68 formed of leather or other suitable material and having a snap fastener 70 for releasable connection with a complementary fastener 72 on a chinstrap 74.

Pierced together in the above-described manner, the inner and outer panels define a plurality of pockets which are accessible through slits located inside the inner helmet and which may be filled with impact absorbing pads. Thus, the areas overlying inner center panels 76 and 78 behind the lateral tape 48 form right and left center pockets 100 and 102 accessible through slits 82 and 84, respectively. Similarly, the area overlying inner side panels 88 and 94 form right and left side pockets 104 and 106 accessible through slits 90 and 96, respectively. Finally, the area overlying all four of the above panels forward of the lateral tape 48 forms a frontal pocket 108 accessible through slit 86.

Right and left center pockets 100 and 102 are supplied with impact-absorbing pads 110 and 112, respectively. In a similar manner, right and left side pockets 104 and 106 are provided with impact-absorbing pads 114 and 116, respectively. As is more fully described in the Aileo patents discussed hereinabove, each of the pads such as pad 110 is formed of any suitable energy absorbing material and preferably is formed with perforations 118 to facilitate ventilation. To further aid ventilation, the pad 110 and the like may be provided with an under layer 120 of urethane or the like having a plurality of bumps or projections 122 for raising the effective surface level.

Figures 11, 12, 13:
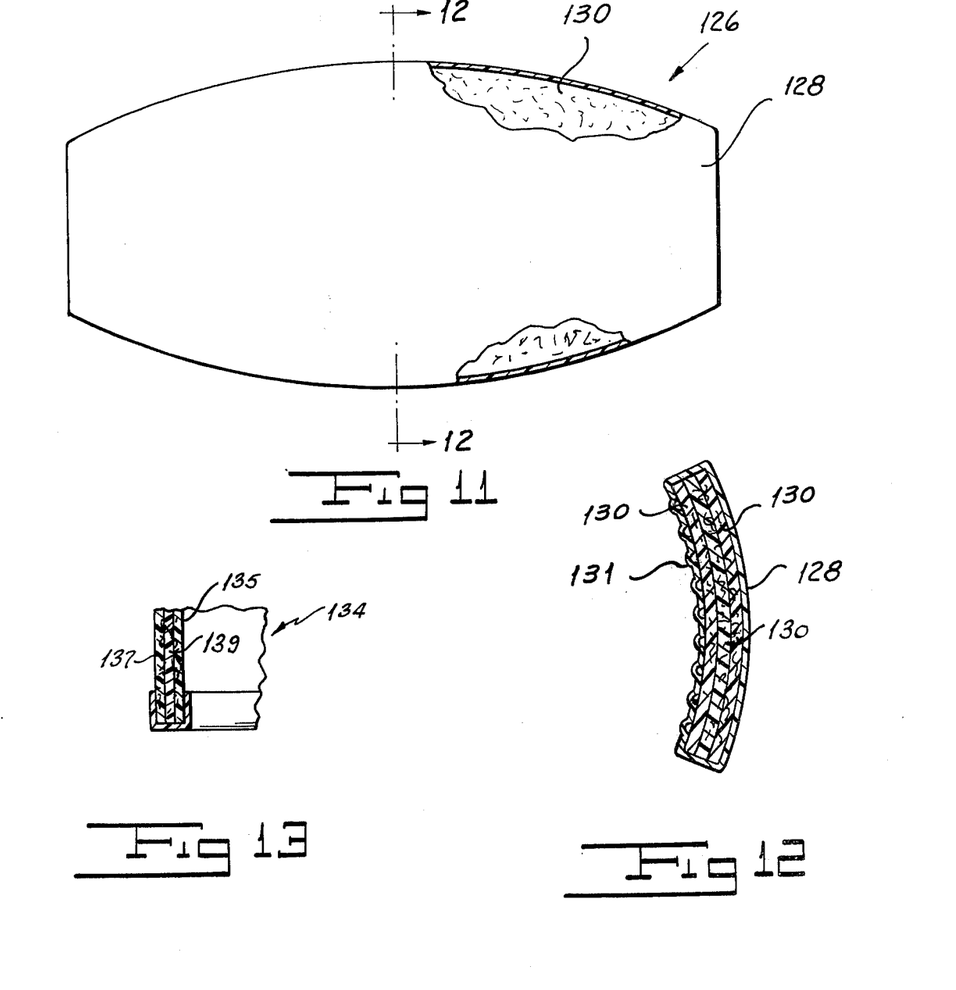
FIG. 11 is an enlarged fragmentary plan partly broken away, of the ballistic frontal pad used in our protective helmet assembly.
FIG. 12 is an enlarged section of the pad shown in FIG. 11, taken along line 12—12 of FIG. 11.
FIG. 13 is an enlarged fragmentary section of the rear portion of the outer shell.

Frontal pocket 108 is provided with a ballistic pad indicated generally by the reference character 126 comprising an outer envelope 128 of urethane or similar material and a plurality of layers 130 of ballistic material. While layers 130 may be made from any high elongation, high tensile strength fibrous material having a high melting point, preferably we use one of the aromids, which include aromatic polyimide resins developed by E. I. duPont de Nemours & Company, and sold under the trademarks "Kevlar" and "Nomex" is selected. The fibrous material making up the laminates 130 may be woven or it may be needlepoint felt, or it may be fibrous material loosely bound together by the use of any suitable binder. The outer envelope 128 prevents moisture from reaching the inner ballistic laminates 130 and adversely affecting its performance. Preferably, we provide the inner surface of envelope 128 with projections or bumps 131 for ventilation.

It will readily be appreciated that the pad 126 affords the wearer ballistic protection against missiles and the like, while the other pads carried by the inner helmet are intended primarily to protect the wearer from injury as a result of bumps and the like. At the same time, this ballistic pad is relatively flexible as compared with the hard outer shell to be described. Thus it can conform relatively closely to the wearer's head to permit him to work relatively closely with instruments being used without exposing himself unnecessarily to injury from ballistic missiles.

Each of the pads 110 to 116 and 126 is of approximately the same size and shape as the corresponding pocket, but is small enough to permit some freedom of movement. Each of the pads is readily insertable in or removable from the respective pad-receiving pocket 100 to 108 through the slit 82, 84, 90, 96, or 86, respectively. The location of each of the slits near the center of its respective pocket minimizes the possibility of a pad slipping free.

It will be seen that the above-described helmet assembly provides impact protection to the wearer, yet, because of the spacing between the various impact-absorbing pads 110 to 116 and 126, is readily adjustable to fit an individual head size. As was stated before, the inner helmet 22 is adjusted in size by suitably coupling the adjustment straps 62 and 60 located near the nape of the neck.

Figure 8:
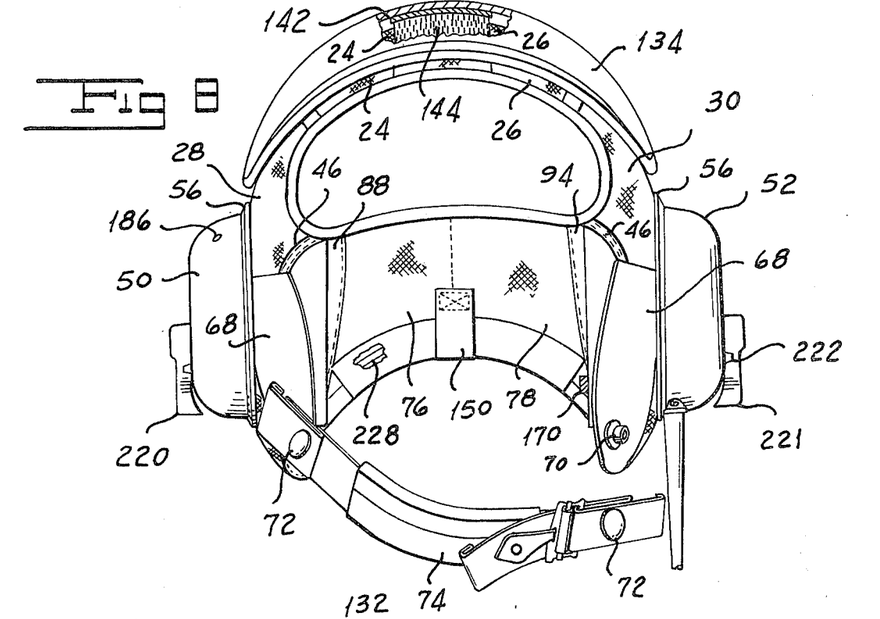
FIG. 8 is a front elevation of our improved protective helmet assembly having a segmental outer shell, with parts broken away.
Figure 9:
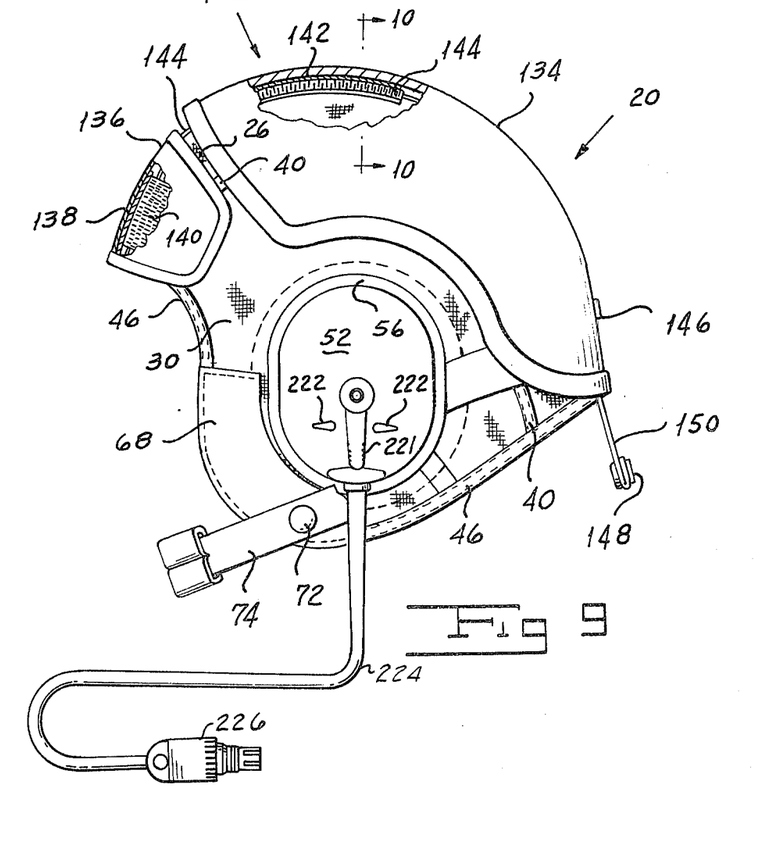
FIG. 9 is a side elevation of the protective helmet assembly shown in FIG. 8, with parts broken away.
Figure 10:
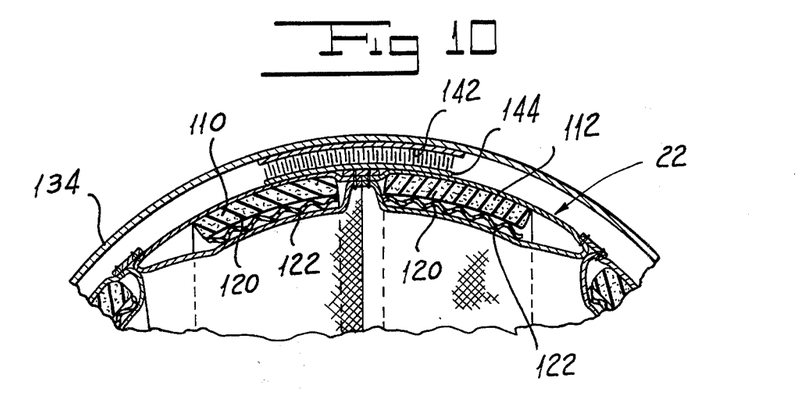
FIG. 10 is a fragmentary section of our protective helmet assembly, taken along the line 10—10 of FIG. 9 and drawn on an enlarged scale.

Our protective helmet assembly includes a rigid outer shell, indicated generally by the reference character 132 made up of a rear portion 134 and a frontal portion 136, the rear portion and the frontal portion being formed as separate bodies.

The frontal outer helmet portion 136 extends over the forehead area of the individual generally coextensively with pad 126 and is preferably formed from fiberglass or the like impregnated with a suitable synthetic resin. The frontal portion 136 has secured along its underside a strip 138 of the hook-and-loop fastener material previously described. Strip 138, together with a complementary strip 140 secured across the front edges of panels 24 and 26 of the inner helmet 22, provide a means for releasably attaching the frontal portion 136 to the inner helmet assembly 22.

The rear outer helmet portion 136 is formed with lateral edges exposing the earcups 50 and 52, a rear edge in alignment with the rear edge of the inner helmet assembly 22, and a front edge in parallel spaced relationship with the rear edge of the frontal portion 136. Rear helmet portion 134 may be formed as an assembly of inner and outer shells 135 and 137 with a layer 139 of fibrous Kevlar or Nomex sandwiched therebetween. Inner and outer shells 135 and 137 may be made for example from polycarbonate resin with a coating of a suitable elastomer. Layer 139 may be woven or it may be needlepoint felt or fibrous material held together with a suitable binder fastener material. A fastening strip 142 of the type previously described is secured along the underside of the rear portion to releasably engage a complementary strip 144 secured to the inner helmet assembly 22. Preferably, strips 142 and 144 are arranged longitudinally along a forward section of the centerline of the rear portion 134. Rear portion 134 is also secured to the inner helmet assembly 22 by a snap fastener 146 provided at its nape end for releasable attachment to a complementary fastener 148 provided on the end of an elastic strap 150 secured to the nape end of the inner helmet 22.

Functionally, the frontal portion 136 serves to distribute the force of impacts over the surface of the ballistic pad 126 located therebelow. The rear portion 134, by contrast, is used both to distribute the force of impacts and to provide ballistic protection. It will be noted that, since the frontal inner ballistic pad 126 extends rearward behind the leading edge of the rear outer portion 134 and laterally to the earcups 50 and 52, the entire head area above and behind the ears is provided with ballistic protection and there are no gaps remaining vulnerable to ballistic impacts. Thus, complete ballistic protection is retained even if the frontal portion 136 is removed to obtain better access to a gunsight, for example, since the inner ballistic pad 126 continues to provide protection in this instance.

By forming the rear portion 134 and frontal portion 136 as separate pieces, it is possible to accommodate a wide range of head sizes without using an excessively large outer shell. Since the frontal portion 136, covering only the forehead, is relatively small, it can follow a small radius of curvature, but still fit most heads. The rear portion 134, extending from the crown to the nape, covers that portion of the head which is relatively invariant as to size, and thus can be made much smaller than the equivalent portion of a single piece outer shell.

Referring now to FIGS. 14 to 19, earcups 50 and 52 are provided with inner peripheral flanges 152 for accepting generally elliptical annular pads 154 and 156 made up of envelopes filled with foamed rubber and assembled on the cups over the flanges 152. Pads 154 and 156 are shaped to envelop the ear in acoustic isolation from the surrounding environment. Right and left earcups 50 and 52 house right and left earphones 158 and 160, respectively. Each of the earphones 158 and 160 is encased in an isolating pad 162 of foamed rubber or the like having a central aperture 163 on its inner face to provide acoustical communication to the ear. A foam pad 164 spaces pad 162 from a cover plate 165 which is assembled to an inner wall flange 166 surrounding an inner recess in the cup by screws 169, or the like. A gasket 168 and a layer 167 of suitable waterproofing material seal the recess.

Figure 17:
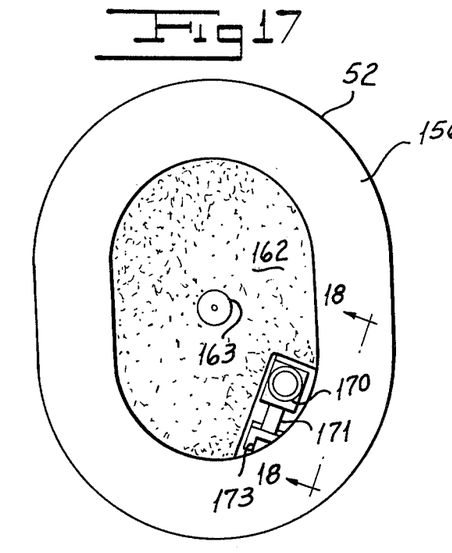
FIG. 17 is a side elevation of the earcup shown in FIG. 15 illustrating the placement of the contact microphone.
Figure 18:
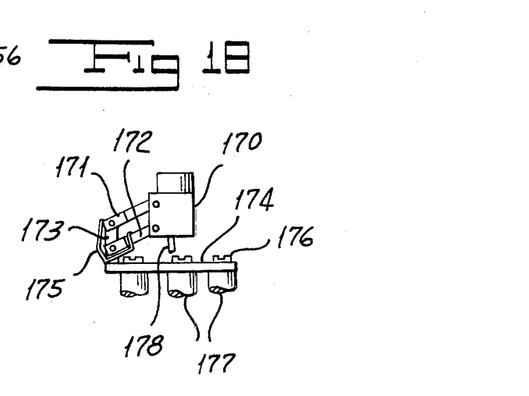
FIG. 18 is a section of the contact microphone mounting assembly, taken along the line 18—18 of FIG. 17.

We mount a spring-loaded microphone 170 in the left earcup 52 at a location at which it contacts a region of the wearer's head at which it picks up vibrations produced as the wearer speaks. The microphone 170 is preferable pivotally attached to the ends of a pair of arms 171 and 172, the other ends of which are pivotally attached to an upstanding support 173 carried by a base 174. A spring 175 placed between arm 172 and the support 173 biases the arms upwardly to urge the microphone into contact with the head of the wearer. The base 174 is rigidly secured to the earcup through suitable screws 176 and spacers 177. A cable 178 containing output leads 180 and 182 extends from the bottom of the microphone 170.

Figures 14, 15, 16:
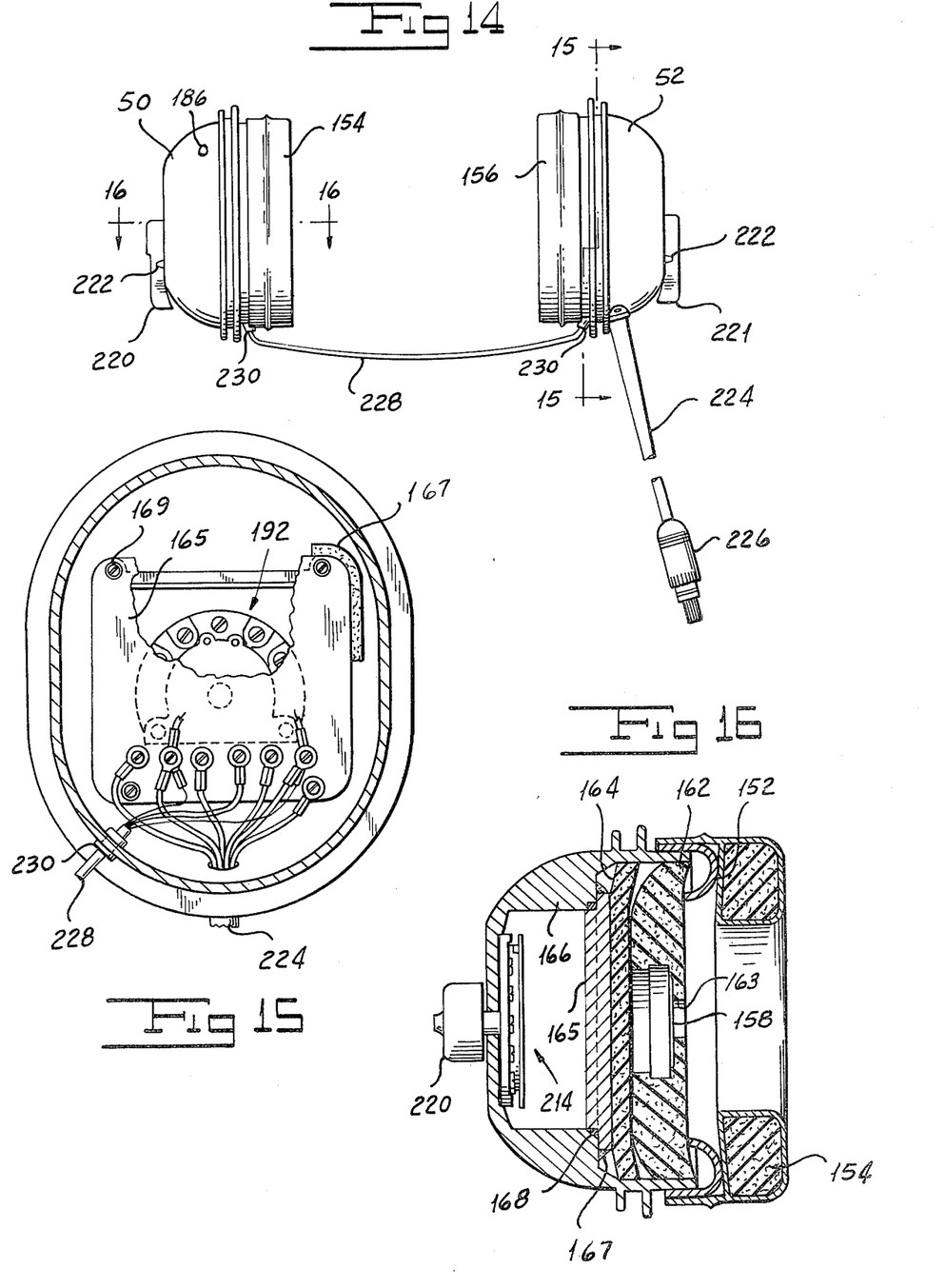
FIG. 14 is a front elevation of the earcups and associated communications equipment incorporated in our protective helmet assembly.
FIG. 15 is an enlarged section of one earcup, taken along the line 15—15 of FIG. 14.
FIG. 16 is an enlarged section of the other earcup, taken along the line 16—16 of FIG. 14.

The right earcup 50 carries a sound intensifier microphone 186 to allow the helmet wearer to listen to outside sounds without removing the helmet. The sound intensifier microphone 186 is preferably rigidly mounted in a suitable aperture formed in the earcup 50 so as to face outwardly to monitor ambient sounds.

Contact microphone leads 180 and 182 are coupled to an amplifier 188, supplied with power from a 6 volt line 190 and the output lead of which is connected to the movable contact of one switch 194 of a triple-pole, double-throw rotary switch assembly indicated generally by the reference character 192. Switch assembly 192 is normally biased into the center position shown in FIG. 19, but may be moved upwardly into a locking "intercom" position or downwardly into a momentary "radio" position. The intercom or upper contact of switch 194 is coupled to a "microphone intercom" line 196, while the radio or lower contact of switch 194 is coupled to a "microphone radio" line 198. The right earphone 158 is directly connected between an "earphone" line 200 and an "earphone ground" line 202. The left earphone 160 is coupled to lines 200 and 202 through a switch 210 which is closed only when the switch assembly 192 is in a center position. The earphone ground line 202 is also coupled to the movable contact of a third switch 204 of the switch assembly 192, the fixed contacts of which are coupled respectively to an intercom line 206 and a radio line 208.

Figure 19:
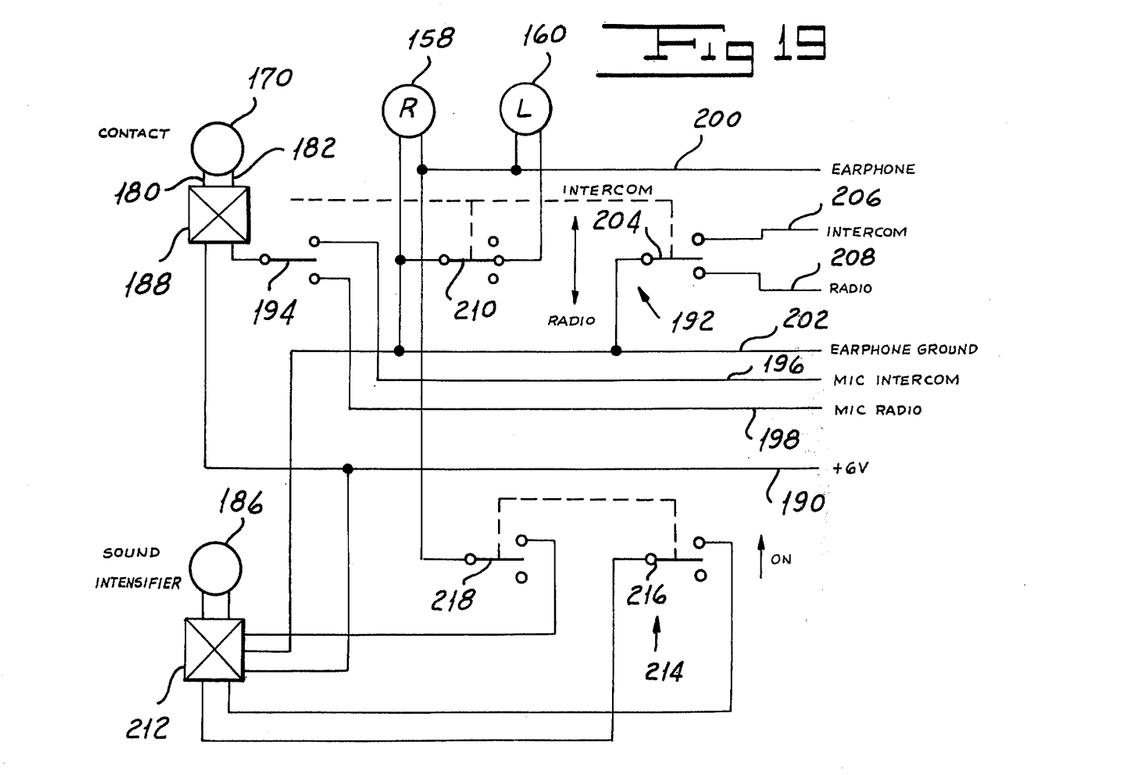
FIG. 19 is a schematic view of the circuit controlling the contact microphone and the earphones.

The sound intensifier microphone 186 feeds an amplifier 202 which is controlled by one switch 216 of a double-pole, double-throw rotary switch assembly indicated generally by the reference character 214. Amplifier 212 receives power from the 6 volt line 190 and has its output leads coupled to the earphone ground line 202 directly and to the earphone line 200 through a second switch 218 of the switch assembly 214.

We mount switch assemblies 192 and 214, respectively, on the inner surfaces of the outer walls of left and right earcups 52 and 50. The switch assemblies include respective control levers 220 and 221 carried by the switch shafts. Preferably, the outer walls of the earcups 50 and 52 are provided with stops 222 to limit movement of levers 220 and 221 to prevent possible damage to the switches 192 and 214. The switches 192 and 214 are protected from moisture by the cover plates 165 enclosing the switches from the inner sides of the respective earcups.

Figure 7:
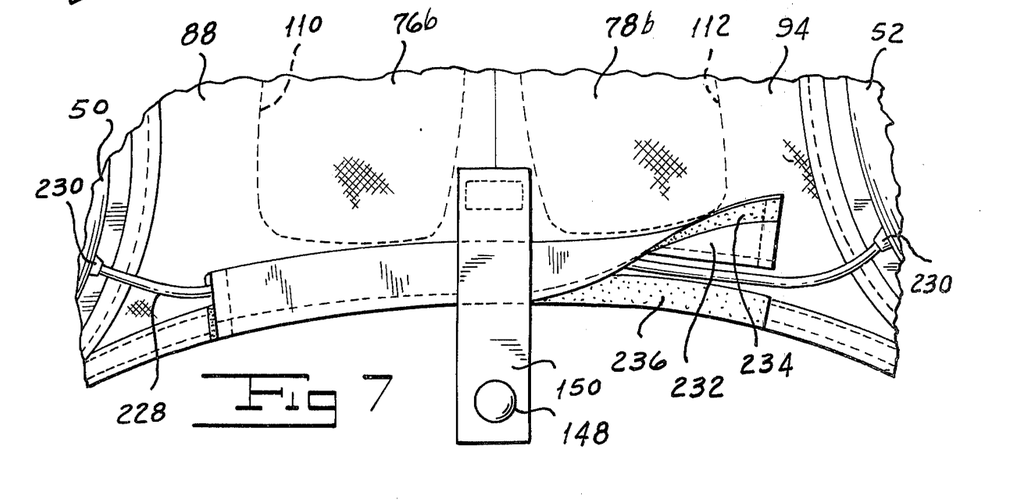
FIG. 7 is a fragmentary section of the inner helmet of our improved ballistic helmet assembly, taken along the line 7—7 of FIG. 2 and drawn on an enlarged scale.

Lines 190, 196, 198, 200, 202, 206, and 208 are made accessible to external equipment through a cable 224 running from the left earcup 52 and terminated by a plug 226. The right earphone 158, the sound intensifier microphone 186, the amplifier 212, and the switch assembly 214 are coupled to the other components in the left earcup 52 through a thin cable 228 which enters the respective earcups through grommets 230 located inwardly of earcup retaining flanges 56. As shown in FIG. 7, the connecting cable 228 runs along the inner side of the helmet within a flap 232 provided with a hook and loop type fastening strip 234 which may be releasably engaged with a complementary strip 236 provided on the inner side of the peripheral tape 46.

The circuit shown in FIG. 19 allows the wearer to communicate readily over two different transmissions systems. The radio system may, for example, be used for long distance communication, while the "intercom" system may be used for persons located in the same vehicle such as a tank. With switch assembly 192 in a center position, the contact microphone 170 is deactivated, while earphones 158 and 160 are connected in parallel between lines 200 and 202 to receive a suitable audio signal. When switch assembly 192 is moved to the intercom position, which is the upper position in FIG. 19, the contact microphone 170 is connected between the 6 volt line 190 and microphone intercom line 196 to provide a suitable signal over the intercom line. At the same time, the left earphone 160 is disconnected from the earphone ground line 202 to prevent undesirable acoustic feedback. In a similar manner, when switch assembly 192 is moved to the radio position, which is the lower position in FIG. 19, the contact microphone 170 is connected between the 6 volt line 190 and the microphone radio line 198 while the left earphone 160 is again disconnected from line 202 to prevent feedback.

With switch assembly 214 in an off position, the sound intensifier microphone 186 is deactivated and the helmet wearer is shielded from the ambient noise by pads 154 and 156. When switch assembly 214 is moved into an on position, the output of the amplifier 212 connected to the sound intensifier microphone 186 is applied across lines 200 and 202 to permit the wearer to monitor outside sounds when desired.

In use of our protective helmet assembly the wearer first dons the inner helmet 22, making such adjustments, described hereinabove, as are necessary to cause the helmet to conform relatively closely to his head. In the absence of the outer shell segments 136 and 134, his head is adequately protected against injury from bumps and the like. With the outer shell segments 134 and 136 in place the wearer's head is protected against injury from ballistic missiles or the like. When in place the front segment 136 serves to distribute the force of impact of bumps over the portion of the inner helmet lying thereunder.

In the event that, under conditions of a possibility of injury from a ballistic missile, the wearer finds it necessary to work with his eye closely adjacent to an instrument such as a gunsight, he may remove the front segment 136 without sacrificing ballistic protection. That is, ballistic pad 126 affords ballistic protection to the front of the wearer's head, while the hard ballistic shell section 134 protects the rear of the wearer's head.

The operation of the earphone and microphone system associated with our helmet will be apparent from the description hereinabove.

It will be seen that we have accomplished the the objects of our invention. We have provided an articulated or segmental ballistic helmet assembly which readily accommodate a wide range of head sizes. Our assembly permits of an unencumbered man-hardware interface without sacrificing ballistic protection. Our assembly enables the wearer to work closely with instruments while at the same time protecting him against injury from ballistic missiles. We provide our helmet assembly with a communication system which does not require a boom-carried microphone.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A protective helmet assembly including in combination, a flexible inner helmet adapted to fit relatively closely over the head of a wearer, respective discrete front and rear rigid outer shell members, said front member adapted to cover the forehead region of the wearer's head, said rear member adapted to cover the wearer's head from the forehead region rearwardly over the crown and toward the nape of the wearer's neck, means for securing said rear member to said inner helmet over the portion thereof corresponding to the head region adapted to be covered by said rear member, and means for manually detachably securing said front shell member to the forehead portion of the inner helmet.

2. A protective helmet assembly as in claim 1 including a pad of flexible ballistic material carried by the portion of said inner helmet underlying said front shell member.

3. A protective helmet assembly as in claim 2 in which said rear shell member is formed of a material which resists penetration by ballistic missiles.

4. A protective helmet assembly as in claim 3 in which said pad of ballistic material is made up of a plurality of laminates of high elongation high tensile strength fibers of synthetic resin having a high melting point.

5. A protective helmet assembly as in claim 4 in which said synthetic resin is an aromatic polyimide resin.

6. An assembly as in claim 2 in which said flexible inner helmet is formed with a front pocket for receiving said pad of flexible ballistic material.

7. An assembly as in claim 6 in which said pocket is formed with a slot to permit manual removal of said pad of flexible ballistic material.

8. A protective helmet assembly as in claim 3 including a plurality of bump-resistant impact-absorbing bodies carried by the portion of said inner helmet underlying said rear outer shell member.

9. An assembly as in claim 3 including moisture-proof outer envelope surrounding said pad of flexible ballistic material.

10. An assembly as in claim 9 in which said moisture-proof outer envelope is formed of polyurethane.

11. An assembly as in claim 3 in which the frontal portion of said helmet assembly is formed from fiberglass impregnated with a synthetic resin.

12. Apparatus as in claim 1 in which said releasable securing means comprises complementary strips of hook- and loop-type fastener elements secured to the inner helmet and to the front outer shell member.

13. A flexible protective helmet assembly as in claim 1 including an earcup carried by said inner helmet, an earphone in said earcup, a contact microphone, means mounting said microphone on said earcup at a location at which it engages the head of a wearer, and means carried by said earcup for alternatively concomitantly enabling said microphone and disabling said earphone or concomitantly disabling said microphone and enabling said earphone.

* * * * *